United States Patent [19]

Lee

[11] Patent Number: 4,486,729

[45] Date of Patent: Dec. 4, 1984

[54] DEVICE TO MAKE AN OBJECT FLOAT THROUGH THE UTILIZATION OF MAGNETS

[76] Inventor: Hae-Chung Lee, #801, 6 Dong, Samik Apt., 20-1, Seocho-dong, Kangnam-ku, Seoul, Rep. of Korea

[21] Appl. No.: 499,142

[22] Filed: May 27, 1983

[30] Foreign Application Priority Data

Dec. 21, 1982 [KR] Rep. of Korea ............... 5716/1982

[51] Int. Cl.³ .................... H01F 7/02; A63H 33/26
[52] U.S. Cl. .................................. 335/306; 446/133; 446/134
[58] Field of Search ............ 308/10; 335/302, 306; 46/45, 234, 235, 236, 238, 239, 240

[56] References Cited

U.S. PATENT DOCUMENTS

| | | | |
|---|---|---|---|
| 3,493,274 | 2/1970 | Emslie et al. ...................... | 308/10 |
| 3,784,945 | 1/1974 | Baermann ...................... | 308/10 X |
| 3,899,223 | 8/1975 | Baermann ...................... | 308/10 |
| 3,976,339 | 8/1976 | Sabnis ...................... | 308/10 |
| 4,233,777 | 11/1980 | Inoue ...................... | 46/238 |

Primary Examiner—George Harris
Attorney, Agent, or Firm—Cushman, Darby & Cushman

[57] ABSTRACT

A magnetic road is provided with a series of magnets having the same pole oriented upwards and an upstanding non-magnetic sidewall extending along at least one side. A magnetic object is provided having longitudinally spaced magnets which either have that same pole oriented downwards, or arranged in corresponding annuli having that same pole oriented radially outwards. In the first instance, additional provisions are made to prevent the object from rolling over. Accordingly, the object can translate along the road adjacent the sidewall while floating on mutually repelling magnetic forces.

8 Claims, 11 Drawing Figures

DEVICE TO MAKE AN OBJECT FLOAT THROUGH THE UTILIZATION OF MAGNETS

This invention relates to enabling certain objects to float at a constant height without the supply of floating power by making use of the magnetic repulsive force acting between the same poles in permanent magnets or electromagnets, moreover, to a device which enables movement of the said objects under the floating state by additionally using a small power source.

The major aspect of the invention is to provide a device showing the phenomenon that a certain object (such as a toy) floats at a constant height as in gravity-free state, to provide a device which makes the said object move here and there under the floating state, and to disseminate the scientific knowledge that any objects can be floated forever without a source of power.

The present invention is described herein with reference to the attached drawings in which preferred embodiments are shown.

IN THE DRAWINGS

DETAILED DESCRIPTION

Figure 1:
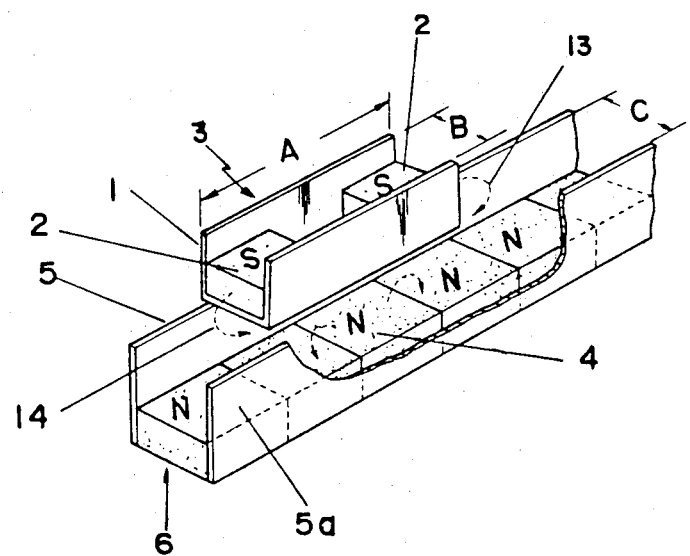
FIG. 1 is a fragmentary exploded perspective view of a first embodiment of the magnetically repellingly-suspended mobile object and stationary magnetically repellingly-suspending road therefor.
Figure 2:
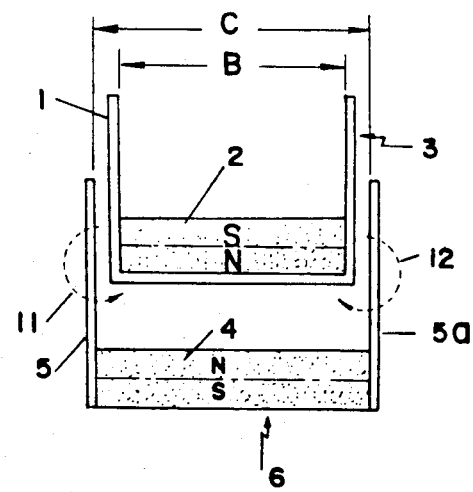
FIG. 2 is an end elevation view of the object and road system of FIG. 1 in an assembled, operating condition.

The detailed description of the present invention is as follows:

In FIGS. 1 and 2, the illustrated embodiment of the present invention primarily includes a basic unit(3) and a magnetic road(6).

The basic unit(3), is an object(1) in a hexahedral form which is made of a nonmagnetic substance such as plastic, with three sides left open as illustrated in FIG. 1 and FIG. 2.

Permanent magnets(2) are placed at both axially opposite ends of the inside of the object which makes-up the basic unit(3) to face the other magnets of the same magnet poles(4) in the magnet road(6), so that a magnetic repelling force interacts between the basic unit(3) and the magnetic road(6).

The shape of the permanent magnets(2) in the basic unit(3) can be made in various forms. The length(A) of the basic unit(3) should be greater than its width(B).

The magnetic road(6), is built by building two walls with nonmagnetic material on both sides, and by laying magnets(4) in a row in between the walls, with the same poles upward. The width(C) of the magnetic road(6), should be a bit larger than that of the basic unit(3). Because of the magnetic repelling force which is acting between the basic unit(3) and the magnetic road(6), the basic unit(3) can be floated above the magnetic road(6).

Figure 4:
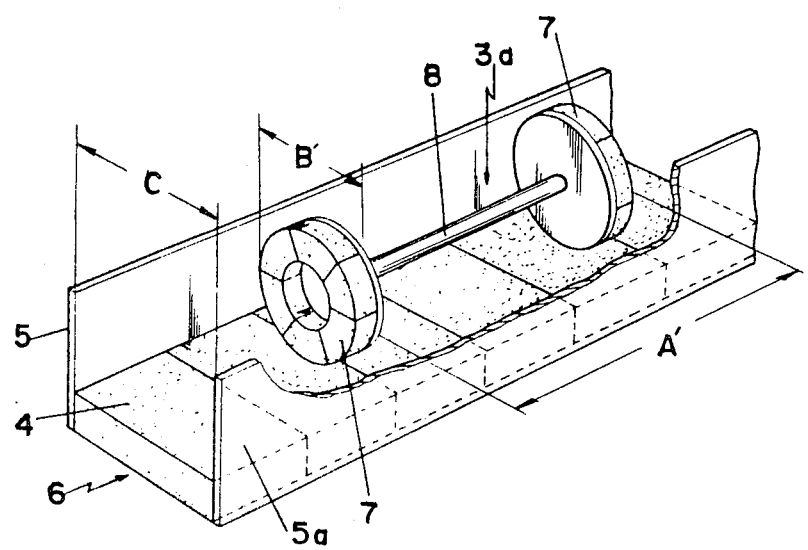
FIG. 4 is a fragmentary perspective view similar to FIG. 1, but showing the near sidewall of the road partly broken away and sectioned so as to expose a second embodiment of the magnetically-suspended mobile object.
Figure 5:
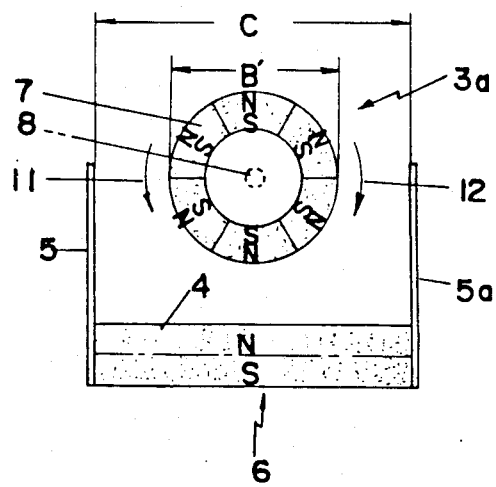
FIG. 5 is an end elevation view of the system shown in FIG. 4.

FIG. 4 and FIG. 5 show a perspective view and an end view of a modified form of the basic unit(3a) respectively. The modified basic unit(3a) has two round-shaped magnet assemblies(7) at both ends of a shaft, each of these magnet assemblies having been put together from a plurality of fan-shaped permanent magnets. The fan-shaped magnets are arranged in such an order that the said fan-shaped magnets on the basic unit(3a) and the magnets on the magnetic road(6) are facing each other with the same poles as in FIG. 5, so that a magnetic repelling force acts between the modified basic unit(3a) and the magnetic road(6).

The basic unit, as show in FIG. 4, is a modified one with two round magnet assemblies(7) placed at both ends of a shaft(8) with the width(B') of the modified basic unit(3a) made smaller than the length(A').

The width(C) of the magnetic road(6) which is shown in FIG. 4 and FIG. 5, is much greater than the width(B') of the modified basic unit(3a) so as to enable the modified basic unit(3a) to float securely above the magnetic road(6).

Figure 3:
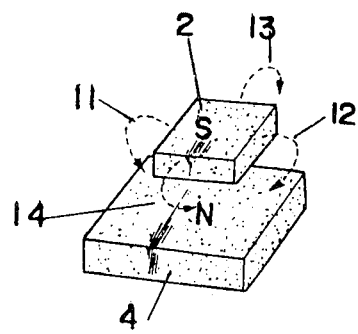
FIG. 3 is a diagrammatic perspective view of an object magnet and a road magnet of FIGS. 1 and 2, for use in illustrating why some of the features shown in the other figures of the drawings are crucial to maintaining the desired magnetic suspension.

The principle made use of in practicing this invention is that, as illustrated in FIG. 3, when the two permanent magnets are placed to face each other with the same poles oriented towards one another, a magnetic repelling force interacts between the two magnets and, if one of the two magnets is fixed, the other magnet will float at a constant height dependent upon the strength of the magnetic repelling force reaches. However, if it is not provided with external confinement, the floating magnet(2) will immediately flip over in one of the four directions (11), (12), (13), (14) and cling to the other magnet(4). Such an unwanted possible mode of operation of the object 1 of FIGS. 1 and 2 has been eliminated by placing the two magnets, with same poles to face each other constantly and constraining them to maintain such a relative orientation.

As shows in FIG. 1, the turning force towards the two directions(13)(14) is removed by making the length(A) of the basic unit(3) longer than its width(B), while, as shown in FIG. 2, the rotating force towards the other two directions (11)(12) is prevented by the walls(5)(5a). That is, the object 1 is so long that it is unlikely to be able to flip-over end for end, because that would involve a need to lift one of the magnets 2 so far upwards, and, at the level at which the object 1 floats between the walls 5, the walls 5 are too close together, given the height of the walls of the object 1 to permit the object 1 to roll over along its longitudinal axis. Therefore, the basic unit(3) can float securely maintaining a constant height above the magnetic road(6).

A modified form of basic unit is provided, as in FIG. 4 and FIG. 5, to come to the solution of the problem that in the version shown in FIGS. 1 and 2, the width(B) of the basic unit(3) has to be enlarged in proportion with increases in the width(C) of the magnetic road(6).

By employing a basic unit which is in a circular form, as in FIG. 4, there is no need to expand the width(B') of the modified basic unit(3a) according on the width(C) of the magnetic road(6). In other words, even though the modified basic unit(3a) because of its circular form, may rotate in one of the directions(11)(12), as shown in FIG. 5, the said modified basic unit(3a) can float over the magnetic road(6) as the status of the magnetic repulsive force acting between the basic unit(3a) and the magnetic road(6), remains basically consistent. Therefore, when the basic unit is constructed in circular form, the width(C) of the magnetic road(6) can be made much larger while the width(B') of the modified basic unit(3a) can remain as it is.

EXAMPLE 1

Figure 6:
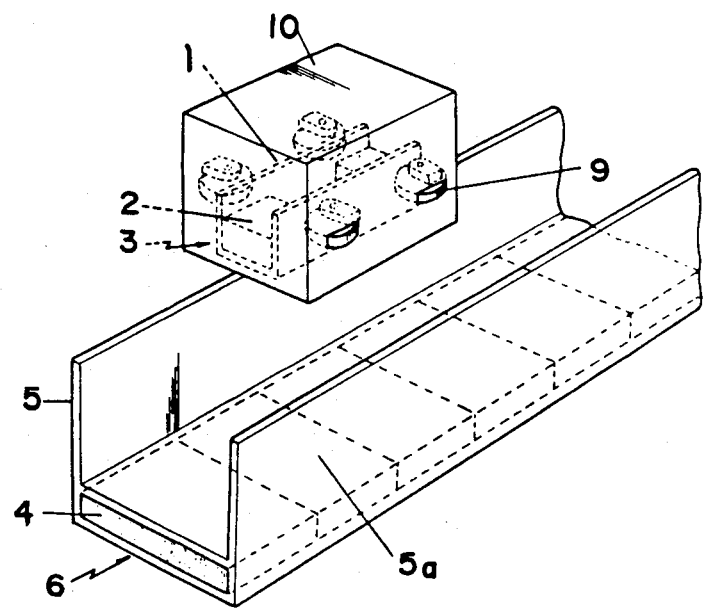
FIG. 6 is an exploded fragmentary perspective view of a more elaborate version of the system shown in FIG. 1.
Figure 7:
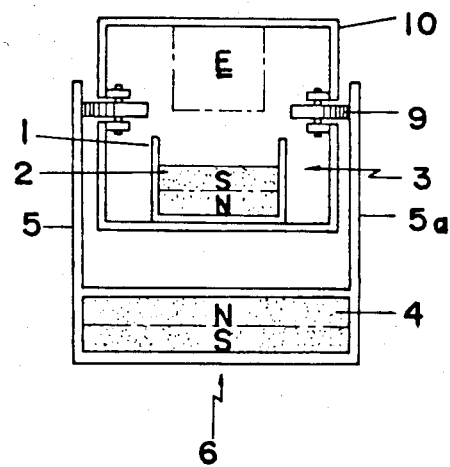
FIG. 7 is a transverse cross-sectional view of the system of FIG. 6 in an assembled, operating condition.

As illustrated in FIG. 6 and FIG. 7, inside of a floating toy(10), the shape of which can be arbitrary, the basic unit(3) as described in FIG. 1 and FIG. 2 is set up. Four rollers(9) may be attached to the body of the toy so as to be in contact along the walls(5)(5a) of the magnetic road(6), and a power source(E) may be installed.

On the other hand, the permanent magnets or the electromagnets(4) which comprise the magnetic road(6) may be replaced with ones that have a different shape, or with differential magnets, in order for the floating toy to move up and down above the magnetic road(6). Some of the magnets(4) of the magnetic road(6) can also be replaced selectively with electromagnets so that the floating toy can move back and forth inside the magnetic road(6) under the floating state by successive magnetization of the electromagnets.

EXAMPLE 2

Figure 8:
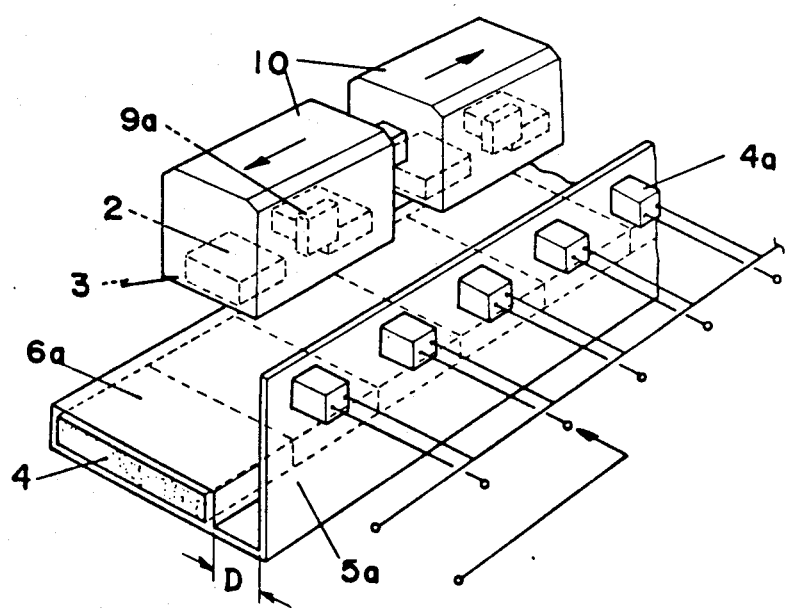
FIG. 8 is an exploded fragmentary perspective view of a variation of the system shown in FIG. 1, in which one sidewall of the magnetic road is eliminated and a system of electromagnets is used for holding the mobile object near the remaining sidewall of the magnetic road.
Figure 9:
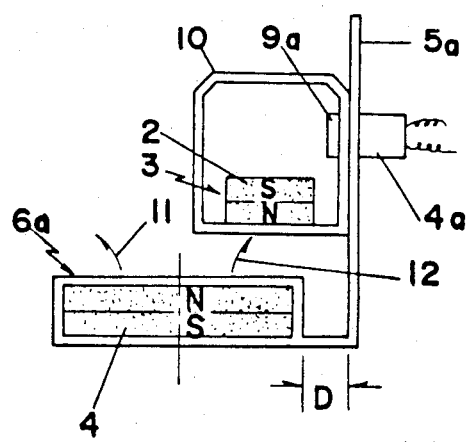
FIG. 9 is a transverse cross-sectional view of the system of FIG. 8 in an assembled, operating condition.

As shows in FIG. 8 and FIG. 9, a modified magnetic road(6a) is formed, as follows: remove one(5) of the two walls(5)(5a) in the magnetic road(6) built according to Example 1; keep a constant distance(D) between the remaining wall(5a) and the magnets(4) in the magnetic road(6); and arrange electromagnets(4a) in a row outside the wall(5a) at a desirable height. Meanwhile, two or more floating toys(10) can be connected in plural, and inside the right walls of ferromagnetic the floating toys(10) a piece of metal(9a) is adhered as shown in FIG. 8 and FIG. 9 to prevent magnetic force(11) in FIG. 9 from having any effect on the floating toys(10), so that they are influenced only by the magnetic force(12) from one side. Therefore, the floating toys can stay float above the modified magnetic road(6a) at a constant height.

Furthermore, if the current passes through the electromagnets successively, the floating toy can move back and forth as the magnetic force acts successively between the electromagnets and metal pieces.

EXAMPLE 3

Figure 10:
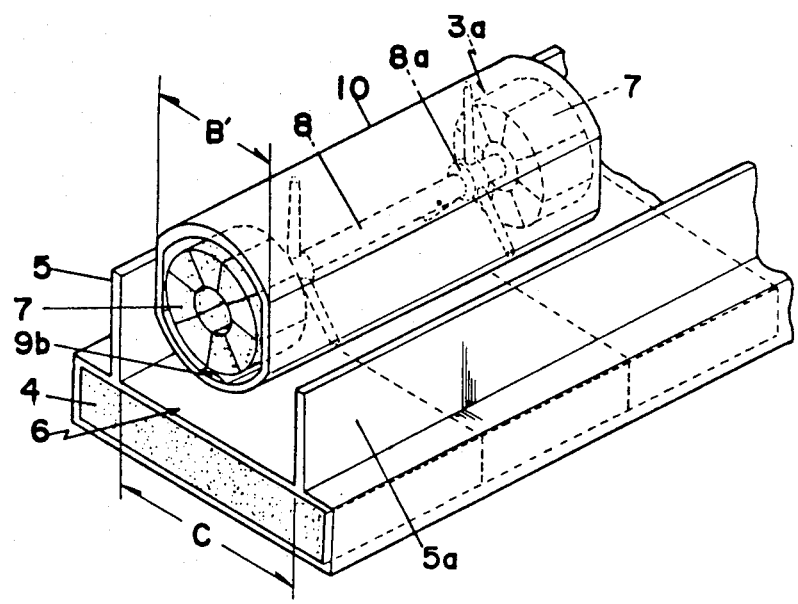
FIG. 10 is a fragmentary perspective view showing a more elaborate version of the mobile object shown in FIG. 4.
Figure 11:
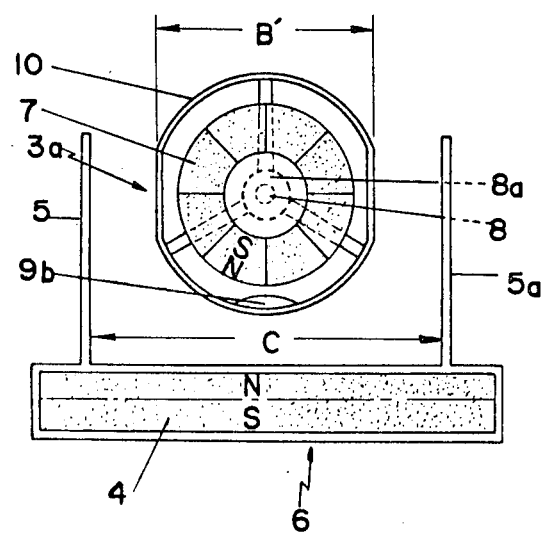
FIG. 11 is an end elevational view thereof.

FIG. 10 and FIG. 11 illustrate an example of a toy incorporating the modified basic unit(3a) illustrated in FIG. 4 and FIG. 5.

In order to prevent the floating toy(10) from inclining into right and left, a weight for maintaining the equilibrium is placed at the bottom center of the said floating toy(10). Moreover, two fixed bosses(8a) are installed inside the floating toy(10), to hold the shaft of the modified basic unit(7). The shaft may be allowed to turn in the bosses.

In this case, the width(C) of the magnetic road(6) can become much greater than the width(B') of a floating toy(10). And, as described in Example 1, some of the magnets in the magnetic road(6) may be replaced with modified magnets, differential magnets and/or electromagnets so that the floating toy(10) can be moved up and down, back and forth, freely.

We claim:

1. A magnetic suspension object and road system comprising:
   a magnetic road, including:
   a magnet means defining an upwardly-presented, longitudinally elongated road surface having but one kind of magnetic pole presented upwardly, and
   at least one side of said road surface being flanked along the length thereof with a wall of non-magnetic material, said wall extending substantially above said road surface; and a magnetic object, including:
   magnet means defining a downwardly-presented, longitudinally elongated arrangement of magnets constrained to have but said one kind of magnetic pole presented downwardly at an underside of said magnetic object;
   said system further including means cooperatingly provided on said magnetic road and on said magnetic object which are constructed and arranged for
   maintaining said magnetic object adjacent said wall of non-magnetic material, and
   preventing the magnetic object from rolling over away from said wall of non-magnetic material about a generally horizontal longitudinal axis in such a manner as would result in downward presentment of opposite magnetic poles from said magnetic object,
   said arrangement of magnets on said magnetic object being so elongated and so concentrated toward opposite ends of said magnetic object, that said magnetic object is constrained against flipping over in an end-over-end sense, so that said magnetic object may be supported above said road surface by repelling magnetic forces for movement along said road surface.

2. The magnetic suspension object and road system of claim 1, wherein:
   said means cooperatingly provided on said magnetic road and on said magnetic object comprise;
   a further wall of non-magnetic material, said further wall of non-magnetic material extending above said road surface along the length of said road surface at the opposite side of said road surface from the first-described wall of non-magnetic material, and
   a pair of non-magnetic opposite sidewall means provided on said magnetic object and upstanding in relation to said magnet means of said magnetic object by such an amount in relation to the width of said magnetic road relative to the width of said magnetic object that said sidewall means of said magnetic object are constructed and arranged to prevent the magnetic object from rolling over on the magnetic road by engagement with said first-described and further walls of non-magnetic material of said magnetic road.

3. The magnetic object and road system of claim 2, wherein:

said opposite sidewall means of said magnetic object incorporate rollers means constructed and arranged to run on said first-described and further walls of non-magnetic material.

4. The magnetic object and road system of claim 1, wherein:

said means cooperatingly provided on said magnetic road and on said magnetic object comprise:
  a longitudinally extending series of electromagnets provided on said wall of non-magnetic material above said road surface; and
  at least one piece of ferromagnetic metal mounted to said magnetic object on a corresponding side thereof and arranged to be successively attracted by said electromagnets.

5. The magnetic object and road system of claim 1, wherein:

said magnet means of said magnetic object include:
  two axially spaced annular assemblies of magnets each having a pole of said one kind presented radially outwardly, and an opposite pole presented radially inwardly,
  said annular assemblies of magnets being at least generally coaxially oriented on a same axis which extends longitudinally of the magnetic object, and
  a shaft extending along said axis and joining said assemblies of magnets.

6. The magnetic object and road system of claim 5, wherein:

said magnetic object further includes a body having two fixed bosses, with said shaft being journalled for rotation in said bosses.

7. The magnetic object and road system of claim 6, wherein:

said magnetic object further includes weight means disposed low on said body for tending to maintain an established spatial orientation of said body even should said magnet means of said magnetic object be rotating.

8. The magnetic object and road system of claim 1, further including;

means for longitudinally moving said magnetic object along said magnetic road while said magnetic object remains supported above said magnetic road by repelling magnetic forces.

* * * * *